(12) United States Patent
Uchino et al.

(10) Patent No.: US 12,477,587 B2
(45) Date of Patent: Nov. 18, 2025

(54) USER EQUIPMENT AND BASE STATION APPARATUS

(71) Applicant: NTT DOCOMO, INC., Tokyo (JP)

(72) Inventors: Tooru Uchino, Tokyo (JP); Hideaki Takahashi, Tokyo (JP); Tomoya Ohara, Tokyo (JP); Lihui Wang, Haidian District (CN); Xiaolin Hou, Haidian District (CN)

(73) Assignee: NTT DOCOMO, INC., Tokyo (JP)

( * ) Notice: Subject to any disclaimer, the term of this patent is extended or adjusted under 35 U.S.C. 154(b) by 409 days.

(21) Appl. No.: 17/605,165

(22) PCT Filed: Apr. 26, 2019

(86) PCT No.: PCT/JP2019/018154
§ 371 (c)(1),
(2) Date: Oct. 20, 2021

(87) PCT Pub. No.: WO2020/217533
PCT Pub. Date: Oct. 29, 2020

(65) Prior Publication Data
US 2022/0210837 A1 Jun. 30, 2022

(51) Int. Cl.
*H04W 74/00* (2009.01)
*H04W 74/08* (2024.01)
*H04W 74/0833* (2024.01)
*H04W 74/0836* (2024.01)
*H04W 74/0838* (2024.01)

(52) U.S. Cl.
CPC .... *H04W 74/0836* (2024.01); *H04W 74/0833* (2013.01); *H04W 74/0838* (2024.01)

(58) Field of Classification Search
CPC ......... H04W 74/0833; H04W 74/0836; H04W 74/0838; H04W 74/006; H04W 74/002; H04W 72/0446; H04W 72/232; H04W 74/004; H04W 80/02; H04W 72/23
See application file for complete search history.

(56) References Cited

U.S. PATENT DOCUMENTS 8,902,838 B2 * 12/2014 Ohta .................. H04W 74/08
370/344
9,480,085 B2 * 10/2016 Park ................ H04W 74/0891
(Continued)

FOREIGN PATENT DOCUMENTS

JP 2013-074447 A 4/2013

OTHER PUBLICATIONS

International Search Report issued in PCT/JP2019/018154 on Jul. 9, 2019 (5 pages).
(Continued)

*Primary Examiner* — Sai Aung
(74) *Attorney, Agent, or Firm* — Osha Bergman Watanabe & Burton LLP

(57) ABSTRACT

A user equipment includes a transmission unit that transmits a first message including a random access preamble in a two-step random access procedure, a reception unit that receives one or more second messages for contention resolution in the two-step random access procedure, and a control unit that controls an operation to receive the second messages based on information associated with an identifier of the first message included in the second messages.

3 Claims, 12 Drawing Sheets

(56) References Cited

U.S. PATENT DOCUMENTS

| | | | |
|---|---|---|---|
| 11,903,039 B2* | 2/2024 | Hong | H04W 74/0833 |
| 2014/0226614 A1 | 8/2014 | Kato et al. | |
| 2018/0103465 A1* | 4/2018 | Agiwal | H04W 74/0833 |
| 2018/0176835 A1* | 6/2018 | Park | H04W 74/0808 |
| 2018/0270791 A1* | 9/2018 | Park | H04W 68/04 |
| 2019/0335392 A1* | 10/2019 | Qiao | H04W 48/16 |
| 2019/0335515 A1* | 10/2019 | Chen | H04W 76/11 |
| 2020/0045650 A1* | 2/2020 | Suzuki | H04W 52/36 |
| 2021/0204316 A1* | 7/2021 | Ye | H04W 74/006 |
| 2022/0141880 A1* | 5/2022 | Wu | H04W 74/0833 |
| | | | 370/328 |
| 2023/0397215 A1* | 12/2023 | Shi | H04W 72/23 |

OTHER PUBLICATIONS

Written Opinion of the International Searching Authority issued in PCT/JP2019/018154 on Jul. 9, 2019 (5 pages).

Nokia, Nokia Shanghai Bell; "On 2-step RACH Procedure"; 3GPP TSG RAN WG1 #96bis, R1-1904716; Xi'an, China; Apr. 8-12, 2019 (16 pages).

3GPP TS 38.321 V15.5.0; "3rd Generation Partnership Project; Technical Specification Group Radio Access Network; NR; Medium Access Control (MAC) protocol specification (Release 15)"; Mar. 2019 (78 pages).

3GPP TS 38.300 V15.5.0; "3rd Generation Partnership Project; Technical Specification Group Radio Access Network; NR; NR and NG-RAN Overall Description; Stage 2 (Release 15)"; Mar. 2019 (97 pages).

Office Action issued in Chinese Patent Application No. 201980095686. 8, mailed on Sep. 6, 2023 (27 pages).

* cited by examiner

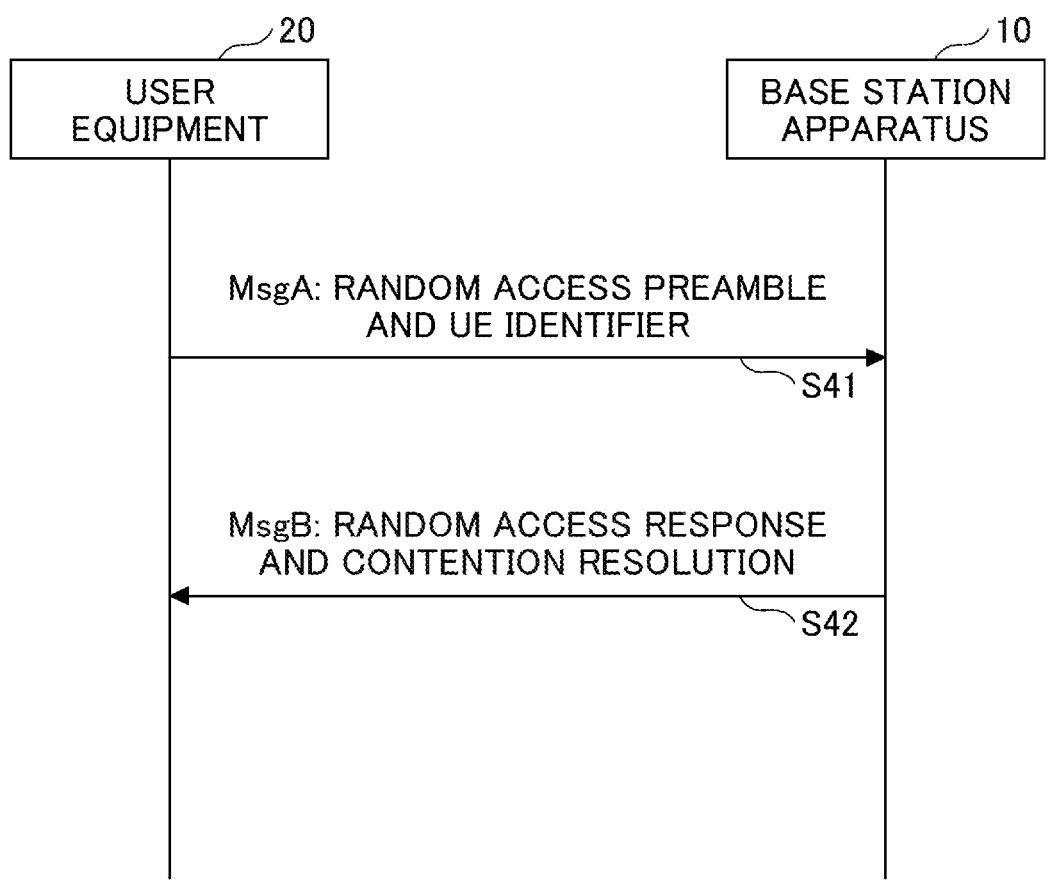

FIG.6

| | |
|---|---|
| R \| Timing Advance Command | Oct 1 |
| Timing Advance Command \| UL Grant | Oct 2 |
| UL Grant | Oct 3 |
| UL Grant | Oct 4 |
| UL Grant | Oct 5 |
| Temporary C-RNTI | Oct 6 |
| Temporary C-RNTI | Oct 7 |

FIG.7

| | |
|---|---|
| UE Contention Resolution Identity | Oct 1 |
| UE Contention Resolution Identity | Oct 2 |
| UE Contention Resolution Identity | Oct 3 |
| UE Contention Resolution Identity | Oct 4 |
| UE Contention Resolution Identity | Oct 5 |
| UE Contention Resolution Identity | Oct 6 |

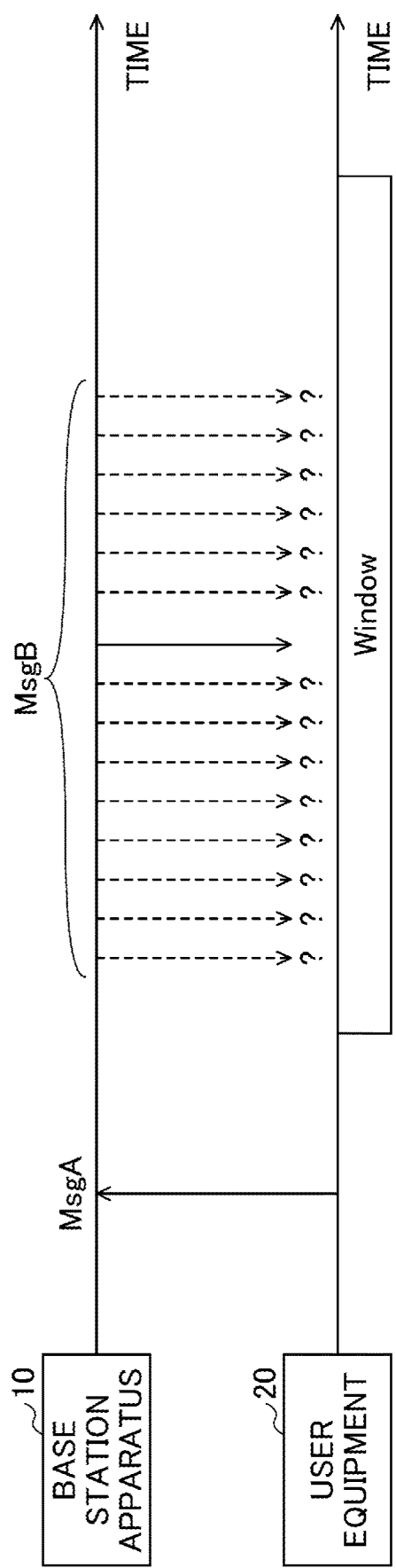

USER EQUIPMENT AND BASE STATION APPARATUS

TECHNICAL FIELD

The present invention relates to a user equipment and a base station apparatus in a radio communication system.

BACKGROUND ART

In NR (New Radio) (also referred to as "5G") as a successor system of LTE (Long Term Evolution), techniques for satisfying a high capacity system, a fast data transmission speed, a low latency, simultaneous connection of a large number of terminals, a low cost, power saving or the like as requirements are being studied (for example, non-patent document 1).

In the NR, similar to the LTE, random access is performed for synchronization establishment or scheduling requests between a user equipment and a base station apparatus. There are two types of random access procedures: CBRA (Contention Based Random Access) procedure and CFRA (Contention Free Random Access) procedure (for example, non-patent document 2).

PRIOR ART DOCUMENT

Non-Patent Document

[Non-Patent Document 1] 3GPP TS 38.300 V15.5.0 (2019-03)
[Non-Patent Document 2] 3GPP TS 38.321 V15.5.0 (2019-03)

SUMMARY OF INVENTION

Problem to be Solved by the Invention

In the contention based random access procedure for an NR radio communication system, a two-step random access procedure is being discussed in addition to the conventional four-step random access procedure. In the two-step random access procedure, when a UE (User Equipment) receives a MsgB, there has been a need to decode a large number of transport blocks including the MsgBs directed to other UEs.

In light of the above aspect, the present invention aims to improve efficiency regarding message reception in the random access procedure.

Means for Solving the Problem

According to a technique disclosed herein, there is provided a user equipment, comprising:
  a transmission unit that transmits a first message including a random access preamble in a two-step random access procedure;
  a reception unit that receives one or more second messages for contention resolution in the two-step random access procedure; and
  a control unit that controls an operation to receive the second messages based on information associated with an identifier of the first message included in the second messages.

Advantage of the Invention

According to the disclosed technique, the efficiency regarding message reception in the random access procedure can be improved.

BRIEF DESCRIPTION OF DRAWINGS

FIG. 5 is a sequence diagram for illustrating an exemplary two-step random access procedure;
FIG. 6 is a diagram for illustrating an exemplary Msg2 for the four-step random access procedure;
FIG. 7 is a diagram for illustrating an exemplary Msg4 for the four-step random access procedure;
FIG. 8 is a diagram for illustrating an exemplary MsgB for the two-step random access procedure.

EMBODIMENTS OF THE INVENTION

Hereinafter, embodiments of the present invention will be described with reference to the drawings. The embodiments described below are merely one example, and embodiments to which the present invention is applied are not limited to the following embodiments.

In operations of a radio communication system of an embodiment of the present invention, existing techniques are used as needed. Note that the existing techniques are existing LTE, for example, but are not limited to the existing LTE. Also, unless specifically stated otherwise, it should be appreciated that the terminology "LTE" used herein has a broader meaning including LTE-Advanced and its subsequent schemes (e.g., NR).

Also, in embodiments of the present invention as described below, terminologies "SS (Synchronization Signal)", "PSS (Primary SS)", "SSS (Secondary SS)", "PBCH (Physical Broadcast Channel)", "PRACH (Physical Random Access Channel)" or the like used in the existing LTE are used. This is due to convenience of recitations, and a signal, a function or the like similar to them may be referred to as other wordings. Also, the above terminologies correspond to "NR-SS", "NR-PSS", "NR-SSS", "NR-PBCH" and "NR-PRACH", respectively, in the NR. Note that even if the signals are used in the NR, they may not be explicitly described as "NR-".

Also, in embodiments of the present invention, a duplex scheme may be TDD (Time Division Duplex) scheme, FDD (Frequency Division Duplex) scheme or other schemes (e.g., flexible duplex scheme or the like).

Also, in embodiments of the present invention, "configuring" a radio parameter or the like may mean that a predetermined value is pre-configured or that a radio parameter indicated from the base station apparatus 10 or the user equipment 20 is configured.

Figure 1:
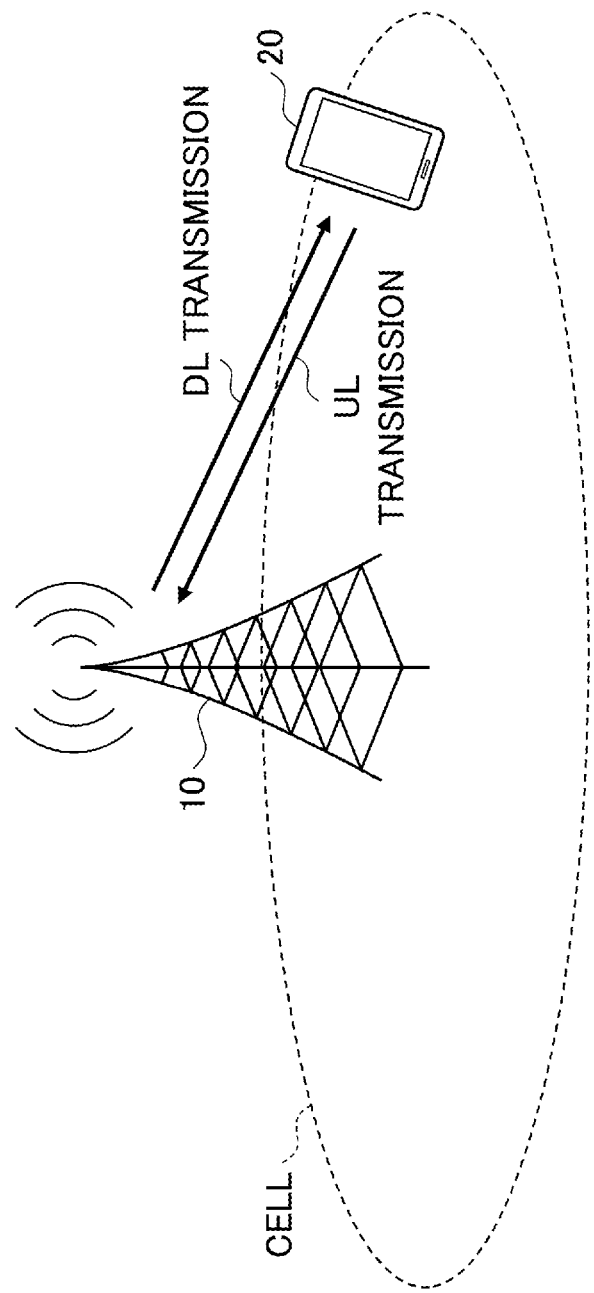
FIG. 1 is a diagram for illustrating a radio communication system according to an embodiment of the present invention.

FIG. 1 is a diagram for illustrating a radio communication system according to an embodiment of the present invention. As illustrated in FIG. 1, the radio communication system according to the embodiment of the present invention includes the base station apparatus 10 and the user equipment 20. In FIG. 1, the single base station apparatus 10 and the single user equipment 20 are illustrated, but the illustrated embodiment is merely one example, and a plurality of the base station apparatuses 10 and a plurality of the user equipments 20 may be provided.

The base station apparatus 10 is a communication device that serves one or more cells and wirelessly communicates to the user equipment 20. A physical resource for a radio signal is defined with a time domain and a frequency domain. The time domain may be defined with the number of OFDM symbols, and the frequency domain may be defined with the number of subcarriers or the number of resource blocks. The base station apparatus 10 transmits a synchronization signal and system information to the user equipment 20. The synchronization signal may be an NR-PSS and an NR-SSS, for example. The system information may be transmitted in an NR-PBCH, for example, and may be also referred to as broadcast information. As illustrated in FIG. 1, the base station apparatus 10 transmits a control signal or data to the user equipment 20 in downlinks (DLs) and receives a control signal or data from the user equipment 20 in uplinks (ULs). Any of the base station apparatus 10 and the user equipment 20 can perform beamforming to transmit and receive signals. Also, any of the base station apparatus 10 and the user equipment 20 can apply MIMO (Multiple Input Multiple Output) communication to the DLs and ULs. Also, any of the base station apparatus 10 and the user equipment 20 may communicate via a SCell (Secondary Cell) and a PCell (Primary Cell) in CA (Carrier Aggregation).

The user equipment 20 is a communication device having a radio communication function such as a smartphone, a portable telephone, a tablet, a wearable terminal, a M2M (Machine-to-Machine) communication module or the like. As illustrated in FIG. 1, the user equipment 20 receives a control signal or data from the base station apparatus 10 in DLs and transmits a control signal or data to the base station apparatus 10 in ULs to use various communication services provided by the radio communication system.

In the random access procedure performed for synchronization establishment or scheduling requests between the user equipment 20 and the base station apparatus 10, for example, the user equipment 20 transmits a random access preamble or a UE (User Equipment) identifier as an UL signal to the base station apparatus 10, and the base station apparatus 10 transmits a random access response and information for contention resolution as a DL signal to the user equipment 20.

Figure 2:
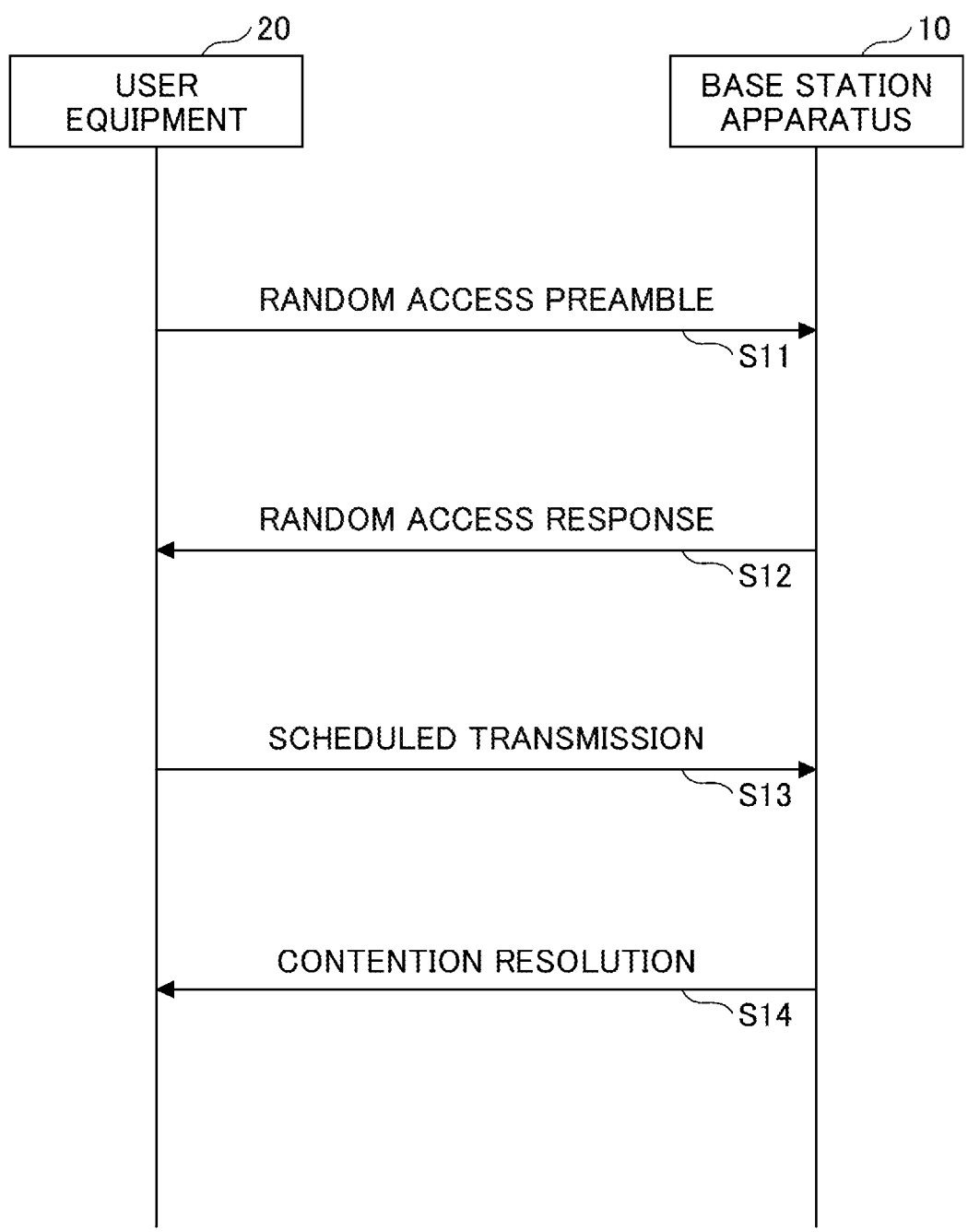
FIG. 2 is a sequence diagram for illustrating an exemplary random access procedure (1)

FIG. 2 is a sequence diagram for illustrating an exemplary random access procedure (1). The exemplary random access procedure shown in FIG. 2 is a contention based random access procedure. Upon starting the contention based random access procedure, at step S11, the user equipment 20 transmits a random access preamble to the base station apparatus 10. Then, the base station apparatus 10 transmits a random access response to the user equipment 20 (S12). Then, the user equipment 20 conducts a transmission to the base station apparatus 10 scheduled with the random access response (S13). In the scheduled transmission, information for identifying the user equipment 20 is transmitted. Then, the base station apparatus 10 transmits information for contention resolution to the user equipment 20 (S14). When the contention resolution is successful, the random access procedure is successfully finished.

Figure 3:
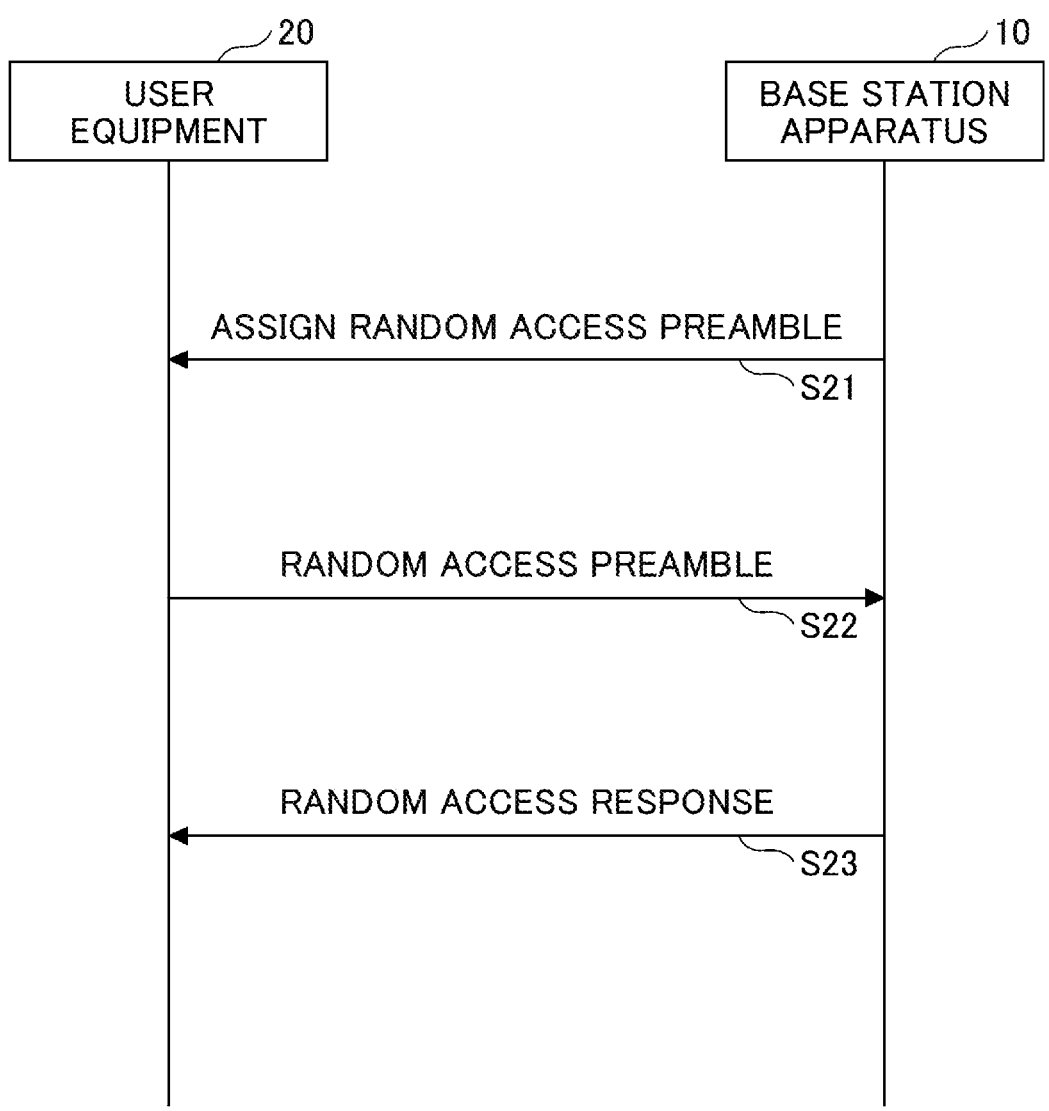
FIG. 3 is a sequence diagram for illustrating an exemplary random access procedure (2)

FIG. 3 is a sequence diagram for illustrating an exemplary random access procedure (2). The exemplary random access procedure shown in FIG. 3 is the contention free random access procedure. Upon starting the contention free random access procedure, at step S21, the base station apparatus 10 assigns a random access preamble to the user equipment 20. Then, the user equipment 20 transmits the assigned random access preamble to the base station apparatus 10 (S22). Then, the base station apparatus 10 transmits a random access response to the user equipment 20.

Figure 4:
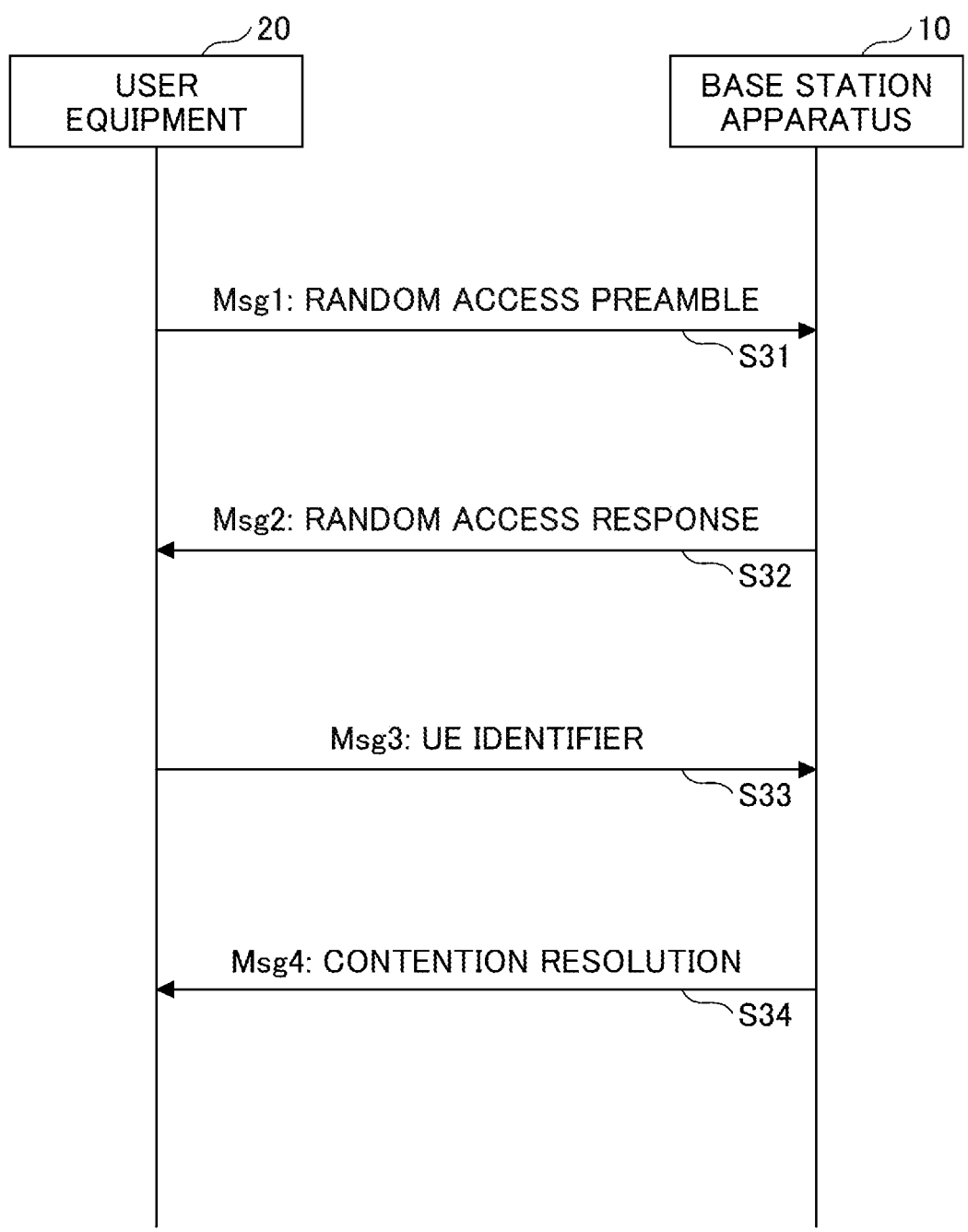
FIG. 4 is a sequence diagram for illustrating an exemplary four-step random access procedure.

FIG. 4 is a sequence diagram for illustrating an exemplary four-step random access procedure. The exemplary random access procedure shown in FIG. 4 is a contention based random access procedure similar to FIG. 2 and is a four-step random access procedure. At step S31, the user equipment 20 transmits a random access preamble as a Msg1 to the base station apparatus 10. Then, the base station apparatus 10 transmits a random access response as a Msg2 to the user equipment 20 (S32). Then, the user equipment 20 transmits a UE identifier as a Msg3 to the base station apparatus 10 (S33). Then, the base station apparatus 10 transmits information for contention resolution as a Msg4 to the user equipment 20. If the contention resolution is successful, the random access procedure is successfully finished.

FIG. 5 is a sequence diagram for illustrating an exemplary two-step random access procedure. The random access procedure shown in FIG. 5 is a contention based random access procedure and is a two-step random access procedure. The two-step random access procedure is discussed to complete the random access procedure in a shorter time. At step S41, the user equipment 20 transmits a random access preamble and a UE identifier as a MsgA to the base station apparatus 10. Then, the base station apparatus 10 transmits a random access response and information for contention resolution as a MsgB to the user equipment 20 (S42). If the contention resolution is successful, the random access procedure is successfully finished.

FIG. 6 is a diagram for illustrating an exemplary Msg2 for the four-step random access procedure. As illustrated in FIG. 6, a "Timing Advance Command", a "UL Grant" and a "Temporary C-RNTI" are included in a MAC (Medium Access Control) payload in the Msg2, that is, in the random access response. Note that "R" denotes a reserved bit.

The "Timing Advance Command" is a parameter for determining a timing of UL transmission. In the base station apparatus 10, reception timings for ULs transmitted from the respective user equipments 20 are adjusted to fall within a predetermined range. The "UL Grant" is a parameter for UL scheduling. The user equipment 20 transmits the Msg3 in ULs based on the "UL Grant". The "Temporary C-RNTI" is a temporary C-RNTI (Cell-Radio Network Temporary Identifier). If the contention resolution is successful in the Msg4, the "Temporary C-RNTI" is used as a C-RNTI.

FIG. 7 is a diagram for illustrating an exemplary Msg4 for the four-step random access procedure. As illustrated in FIG. 7, a "UE Contention Resolution Identity" is included in the Msg4, that is, in the "contention resolution". If the received "UE Contention Resolution Identity" corresponds to information transmitted in the Msg3, the user equipment 20 determines that the contention resolution is successful. Namely, if the Msg3 including a CCCH SDU is transmitted, upon a PDCCH (Physical Downlink Control Channel) for transmitting the Msg4 being addressed to the Temporary C-RNTI and a portion of the transmitted CCCH SDU being included, it is determined that the contention resolution is successful. Subsequently, the above random access procedure for the contention resolution is referred to as a "random access procedure using the CCCH SDU".

If the Msg3 including the C-RNTI is transmitted, upon the PDCCH for transmitting the Msg4 being addressed to the C-RNTI or the PDCCH for transmitting the Msg4 being addressed to the C-RNTI and including the UL Grant, it is determined that the contention resolution is successful. Subsequently, the above random access procedure for the contention resolution is referred to as a "random access procedure using no CCCH SDU".

Here, in the MsgB for the two-step random access procedure, it is assumed that information corresponding to contents of the Msg2 and information corresponding to contents of the Msg4 for the four-step random access procedure are multiplexed and transmitted. It is assumed that codes for use in scrambling the MsgB are calculated based on frequency and time resources for transmission of the MsgA as in a conventional RA-RNTI (Random Access Network Temporary Identifier), for example. The conventional RA-RNTI is calculated with the following formula, $$RA\text{-}RNTI = 1 + s\_id + 14 \times t\_id + 14 \times 80 \times f\_id + 14 \times 80 \times 8 \times ul\_carrier\_id.$$

The s_id is an index for the first OFDM symbol of a PRACH occasion, and $0 \leq s\_id \leq 14$. The t_id is an index for the first slot of the PRACH occasion in a system frame, and $0 \leq f\_id \leq 8$. The ul_carrier_id is configured with 0 for a NUL (Normal Uplink) carrier and 1 for a SUL (Supplementary Uplink) carrier.

FIG. 8 is a diagram for illustrating exemplary reception of the MsgB for the two-step random access procedure. After transmitting the MsgA, the user equipment 20 attempts to receive the MsgB within a window having a predetermined period. Hereinafter, this window is referred to as a "MsgB reception window". Through reception of a PDCCH and a PDSCH (Physical Downlink Shared Channel) for receiving the MsgB, the MsgB is received. The base station apparatus 10 may receive a large number of MsgAs having different random access preamble indices in a resource having the same frequency domain and time domain. Accordingly, if the conventional RA-RNTI is used, it is assumed that a large number of MsgBs are scrambled with the same RA-RNTI. As illustrated in FIG. 8, since it is unknown in which slot in the MsgB reception window the base station apparatus 10 transmits the MsgB corresponding to the MsgA transmitted by the user equipment 20, a large number of transport blocks including MsgBs directed to other user equipments 20 must be decoded. As a result, a higher processing capability is required for the user equipment 20, and thus some problems arise such as an increasing UE cost, a battery consumption of the UE and latency of the next random access procedure.

Then, information regarding to which MsgA the MsgB is transmitted is transmitted from the base station apparatus 10 to the user equipment 20. For example, the base station apparatus 10 may include information regarding an identifier for identifying the MsgA in the MsgB. The MsgB may be a message corresponding to the contention resolution in the random access procedure.

The RNTI for use in reception of the MsgB may be identified with a random access preamble index (which may be referred to as "RAP_ID" hereinafter). For example, the RNTI for use in reception of the MsgB may be calculated in accordance with the following formula, $$RNTI = 1 + s\_id + 14 \times t\_id + 14 \times 80 \times f\_id + 14 \times 80 \times 8 \times ul\_carrier\_id + 14 \times 80 \times 8 \times 2 \times RAP\_ID.$$

For example, RAP_ID may range from 0 to 64.

Figure 9:
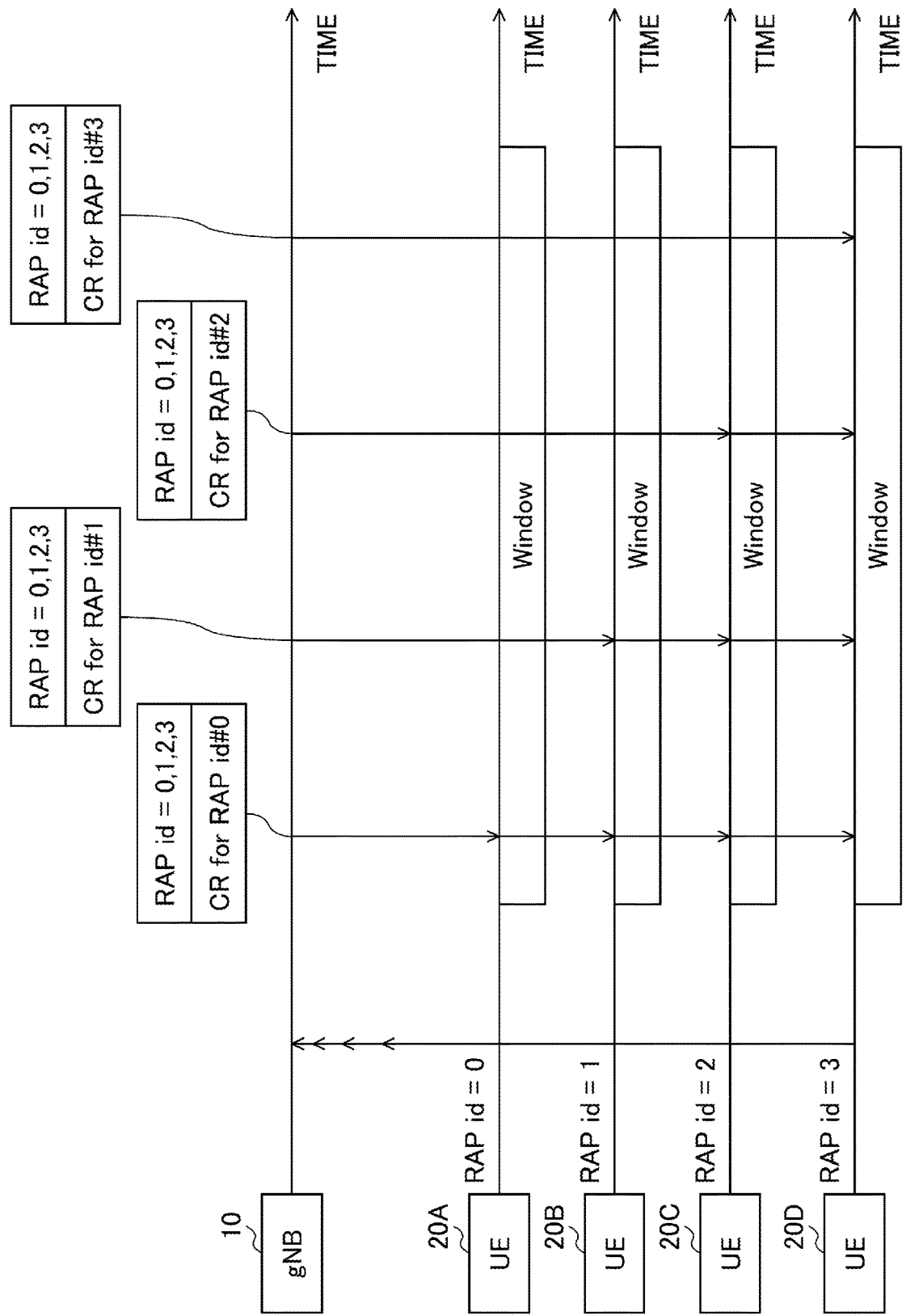
FIG. 9 is a diagram for illustrating an exemplary random access procedure (1) according to an embodiment of the present invention.

FIG. 9 is a diagram for illustrating an exemplary random access procedure (1) according to an embodiment of the present invention. The base station apparatus 10 may include information indicative of a predetermined identifier in the MsgB, to which the same scrambling is applied within the MsgB reception window, and transmit it to the user equipment 20. Hereinafter, it is assumed that the predetermined identifier is an identifier for identifying the MsgA or the user equipment 20. The predetermined identifier may be any of the identifiers as follows, a) a random access preamble index;
  b) an identifier corresponding to a resource of the frequency domain and the time domain of a random access channel; and
  c) an ID of the UE (for example, a C-RNTI).

The above predetermined identifier may be indicated in any of manners as follows, a) The value of the identifier may be indicated. If the multiple identifiers can be indicated, the length of the field for the identifiers may be indicated together.
  b) A bitmap may be indicated. Correspondence between respective bits of the bitmap and the identifier may be explicitly indicated in an RRC Radio Resource Control) signaling, a MAC (Medium Access Control) signaling, and a PHY (Physical Layer) signaling, for example. Also, if the identifier of a random access preamble index is indicated, for example, the correspondence between the respective bits of the bitmap and the identifier may be mapped from the LSB (Least Significant Bit) of the bitmap in the ascending order of the random access preamble indices. Alternatively, it may be mapped from the MSB (Most Significant Bit) of the bitmap in ascending order of the random access preamble indicates. Alternatively, it may be mapped from the LSB or the MSB of the bitmap in the descending order of the random access preamble indices.

As illustrated in FIG. 9, UE 20A, UE 20B, UE 20C and UE 20D transmits the MsgAs having different RAD_IDs to the base station apparatus 10 in a resource composed of the same frequency and time domain. The base station apparatus 10 includes information for contention resolution corresponding to the respective RAD_IDs as well as information for indicating that the RAD_IDs are 0, 1, 2 and 3 in the MsgB, to which the same scrambling code is applied, and transmits the resulting MsgB to the user equipment 20. Although the same scrambling code is used in the above embodiment, there may be cases where a predetermined, a given or a certain type of scrambling code may be applied. Although the same scrambling code is applied below, the predetermined, the given or the certain type of scrambling code may be applied similarly.

Here, if the MsgA having the RAP_ID=1 transmitted from the UE 20B is not received at the base station apparatus 10, the base station apparatus 10 includes information for indicating that the RAD_IDs are 0, 2 and 3 in the MsgB and transmits the resulting MsgB to the user equipment 20. Since the information for indicating that the RAP_ID is 1 is not included in the MsgB, the UE 20B can determine that the transmission of the MsgA has been unsuccessful at the reception timing of the MsgB including the information for indicating that the RAD_IDs are 0, 2 and 3 and accordingly stop receiving the MsgB halfway in the MsgB reception window.

Also, since upon receiving the number of MsgBs corresponding to the number of the RAP_IDs indicated in the information included in the MsgBs, the UE 20 can determine that any additional MsgBs will not be transmitted, the UE 20 can stop reception operations of the MsgB halfway in the MsgB reception window.

Figure 10:
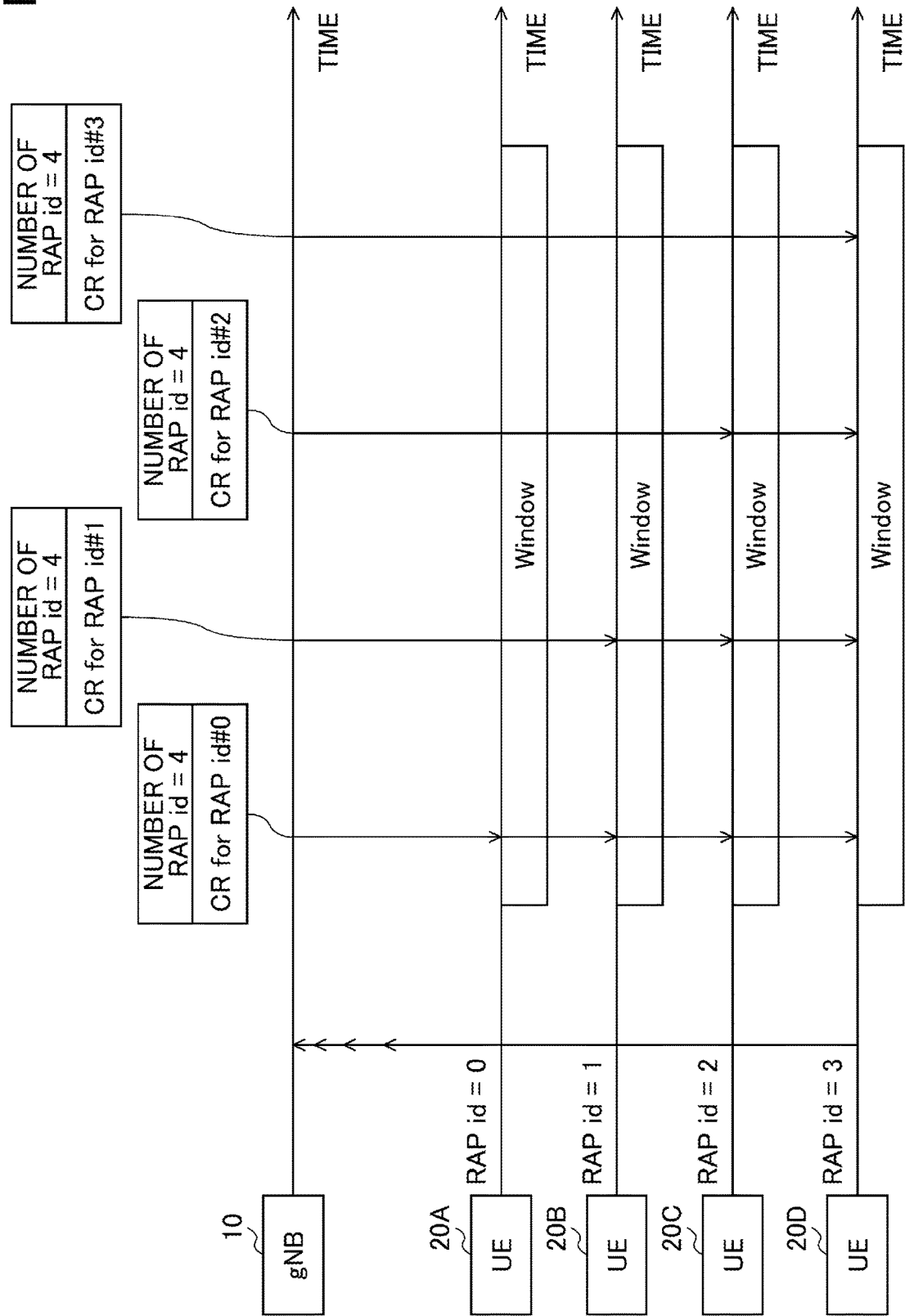
FIG. 10 is a diagram for illustrating an exemplary random access procedure (2) according to an embodiment of the present invention.

FIG. 10 is a diagram for illustrating an exemplary random access procedure (2) according to an embodiment of the present invention. The base station apparatus 10 may indicate a predetermined number of identifiers to the user equipment. The base station apparatus 10 may include a total number of predetermined identifiers transmitted by MsgB within the MsgB reception window in the MsgB, to which the same scrambling is applied, and transmit the resulting MsgB to the user equipment 20. The user equipment 20 attempts to decode transport blocks, at a maximum for as many times as the total number of predetermined identifiers received, within the MsgB reception window.

For example, as illustrated in FIG. 10, the UE 20A, the UE 20B, the UE 20C and the UE 20D each transmit the MsgA having a different RAP_ID to the base station apparatus 10 in a resource composed of the same frequency and time domain. The base station apparatus 10 includes information for contention resolution corresponding to the respective RAP_IDs as well as information for indicating that the number of RAP_IDs is four in the MsgB, to which the same scrambling code is applied, and transmits the resulting MsgB to the user equipment 20.

Here, if the MsgA having the RAP_ID=2 transmitted from the UE 20C is not received at the base station apparatus 10, the base station apparatus 10 includes information for indicating that the number of RAP_IDs is three in the MsgB and transmits the resulting MsgB to the user equipment 20. Namely, the base station apparatus 10 includes the information regarding the predetermined identifier corresponding to the received MsgA in the MsgB. The UE 20C receives the MsgB including the information for indicating that the number of RAP_IDs is three and upon receiving the MsgB three times, can determine that any more MsgB will not be transmitted. As a result, the UE 20C can stop reception operations for the MsgB halfway in the MsgB reception window.

Figure 11:
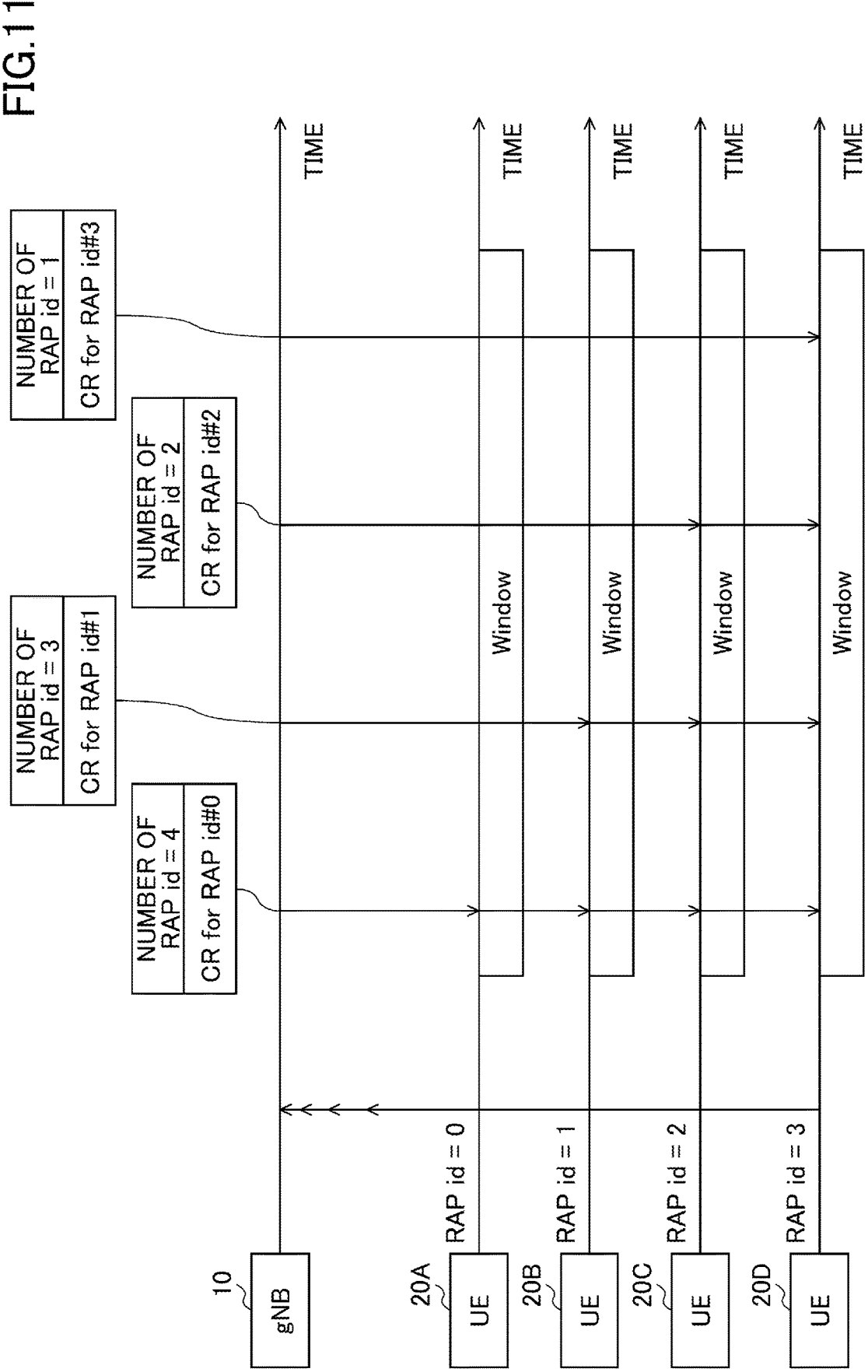
FIG. 11 is a diagram for illustrating an exemplary random access procedure (3) according to an embodiment of the present invention.

FIG. 11 is a diagram for illustrating an exemplary random access procedure (3) according to an embodiment of the present invention. The base station apparatus 10 may include, in an MsgB to which the same scrambling coded is applied, a total number of predetermined identifiers to be transmitted after the transmission timing of the MsgB within the MsgB reception window, and transmit the resulting MsgB to the user equipment 20. The user equipment 20 attempts to decode transport blocks, at a maximum for as many times as the total number of the predetermined identifiers received, within the MsgB reception window after the timing.

For example, as illustrated in FIG. 11, the UE 20A, the UE 20B, the UE 20C and the UE 20D each transmit the MsgA having a different RAP_ID to the base station apparatus 10 in a resource composed of the same frequency and time domain. For the MsgBs, to which the same scrambling code is applied, the base station apparatus 10 includes information for contention resolution corresponding to the respective RAP_IDs as well as information indicative of the number of RAP_IDs being four in the first MsgB, information indicative of the number of RAP_IDs being three in the second MsgB, information indicative of the number of RAP_IDs being two in the third MsgB and information indicative of the number of RAP_IDs being one in the fourth MsgB and transmits the resulting MsgBs to the user equipment 20.

Here, for example, if the MsgA having the RAP_ID=3 transmitted from the UE 20D is not received at the base station apparatus 10, the base station apparatus 10 includes information indicative of the number of RAP_IDs being three, information indicative of the number of RAP_IDs being two and information indicative of the number of RAP_IDs being one in the first MsgB, the second MsgB and the third MsgB, respectively, and transmits the resulting MsgBs to the user equipment 20. Namely, the base station apparatus 10 includes information regarding the predetermined identifiers corresponding to the received MsgAs in the MsgBs. Since upon receiving the MsgB including the information indicative of the number of RAP_IDs being one, the UE 20D can determine that no additional MsgB will be transmitted, the UE 20D can stop reception operations for the MsgB halfway in the MsgB reception window.

Note that the manner of including the information indicative of the predetermined identifier in the MsgB as illustrated in FIG. 9 and the manner of including the information indicative of the number of the predetermined identifiers in the MsgB as illustrated in FIGS. 10 and 11 may be applied to one or more MsgBs transmitted within a predetermined period (for example, within the MsgB reception window).

Note that the manner of including the information indicative of the predetermined identifier in the MsgB as illustrated in FIG. 9 and the manner of including the information indicative of the number of the predetermined identifiers in the MsgB as illustrated in FIGS. 10 and 11 may be switched depending on situations. For example, the switching may be performed based on an RRC signaling, a MAC signaling or a PHY signaling.

Note that in any of the manner of including the information indicative of the predetermined identifier in the MsgB as illustrated in FIG. 9 and the manner of including the information indicative of the number of the predetermined identifiers in the MsgB as illustrated in FIGS. 10 and 11, the information regarding the predetermined identifier may be received in another MAC-PDU (Protocol Data Unit) and another transport block, separate from the MAC-PDU and the transport block including the contention resolution.

Note that the user equipment 20 may indicate a capability as to how may MAC-PDUs and transport blocks it can process within a unit time (for example, a slot) to the base station apparatus 10.

In FIGS. 9, 10 and 11, multiple MsgBs may be transmitted from the base station apparatus 10 to the user equipment 20. If the reception timings of the multiple MsgBs are close to each other, the user equipment 20 must perform decoding in parallel. To this end, operations on message reception at the user equipment 20 in FIGS. 9, 10 and 11 shown in 1) and 2) as follows may be defined.

1) To-be-received or to-be-decoded messages may be transmitted at an interval longer than or equal to a predetermined processing time. The predetermined processing time may be time required to decode a PDSCH. Information regarding the time required to decode the PDSCH may be reported as a UE capability from the user equipment 20 to the base station apparatus 10.

2) To-be-received or to-be-decoded messages may be processed such that a predetermined number of messages can be received or decoded in parallel. For example, the messages that can be received or decoded in parallel may be processed in different HARQ (Hybrid Automatic Repeat Request) processes. The maximum number of messages that can be received or decoded in parallel may be the maximum value of the HARQ process number supported by the user equipment 20. The HARQ number for use in the HARQ processes may be used in ascending order from a predetermined number (for example, 0) or in descending order from a predetermined number (for example, the maximum value).

Note that the base station apparatus 10 may be replaced with the user equipment 20 in the above-stated embodiments. Namely, the two-step random access procedure may be performed between the user equipments 20.

According to the above-stated embodiments, in the two-step random access procedure, the user equipment 20 can stop reception operations for the MsgB in the MsgB reception window depending on situations by obtaining the information regarding the predetermined identifier in the MsgB.

Namely, the efficiency of message reception in the random access procedure can be improved.

(Device Arrangement)

Next, exemplary functional arrangements of the base station apparatus 10 and the user equipment 20 that perform operations as stated above are described. The base station apparatus 10 and the user equipment 20 include functions of implementing the above-stated embodiments. Note that the base station apparatus 10 and the user equipment 20 each may have only a portion of the functions of the embodiments.

<Base Station Apparatus 10>

Figure 12:
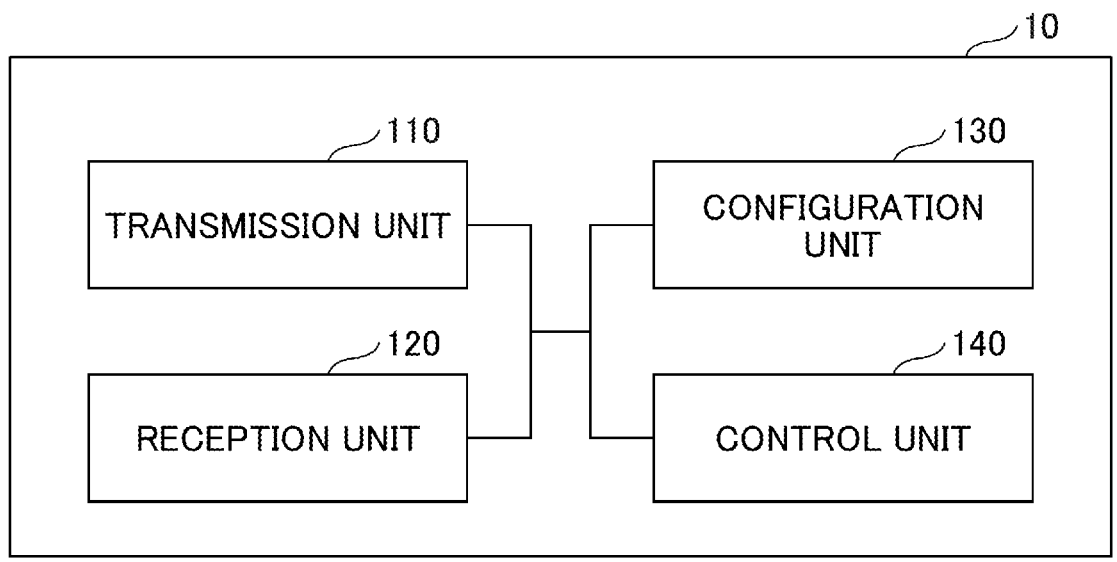
FIG. 12 is a diagram for illustrating one exemplary functional arrangement of a base station apparatus 10 according to an embodiment of the present invention.

FIG. 12 illustrates an exemplary functional arrangement of the base station apparatus 10. As shown in FIG. 12, the base station apparatus 10 includes a transmission unit 110, a reception unit 120, a configuration unit 130 and a control unit 140. The functional arrangement shown in FIG. 12 is only one example. The functional separation and the names of the functional units may be arbitrary as long as operations according to the present embodiment can be achieved.

The transmission unit 110 includes a function of generating a signal for transmission to the side of the user equipment 20 and wirelessly transmitting the signal. The reception unit 120 includes a function of receiving various signals transmitted from the user equipment 20 and acquiring information for upper layers from the received signals, for example. Also, the transmission unit 110 includes a function of transmitting an NR-PSS, an NR-SSS, an NR-PBCH, a DL/UL control signal, a DL/UL data signal or the like to the user equipment 20.

The configuration unit 130 stores preconfigured configurations and various configurations for transmission to the user equipment 20 in a memory and reads out them from the memory as needed. Contents of the configurations may be configurations regarding random access or the like, for example.

The control unit 140 performs the two-step random access procedure or the four-step random access procedure as stated in conjunction with the embodiments. The functional portions of the control unit 140 related to signal transmission may be included in the transmission unit 110, and the functional portions of the control unit 140 related to signal reception may be included in the reception unit 120.

<User Equipment 20>

Figure 13:
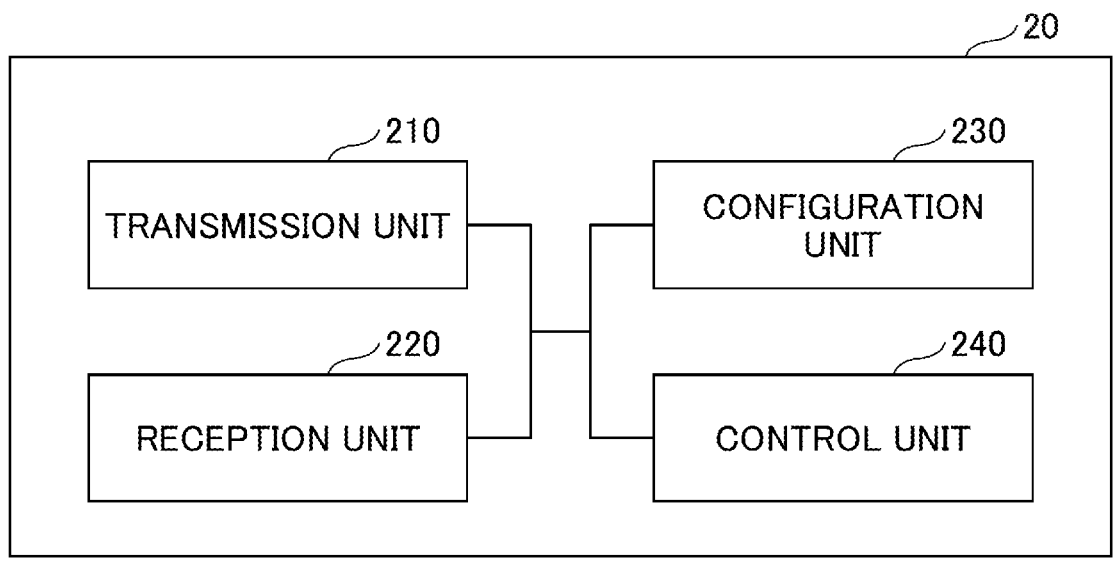
FIG. 13 is a diagram for illustrating one exemplary functional arrangement of a user equipment 20 according to an embodiment of the present invention.

FIG. 13 is a diagram for illustrating one exemplary functional arrangement of the user equipment 20. As illustrated in FIG. 13, the user equipment 20 has a transmission unit 210, a reception unit 220, a configuration unit 230 and a control unit 240. The functional arrangement shown in FIG. 13 is only one example. The functional separation and the names of the functional units may be arbitrary as long as operations according to the present embodiment can be achieved.

The transmission unit 210 generates a transmission signal from transmission data and wirelessly transmits the transmission signal. The reception unit 220 wirelessly receives various signals and acquires signals for upper layers from the received physical layer signals. Also, the reception unit 220 has a function of receiving an NR-PSS, an NR-SSS, an NR-PBCH, a DL/UL/SL control signal and so on transmitted from the base station apparatus 10. Also, for example, as D2D communication, the transmission unit 210 transmits a PSCCH (Physical Sidelink Control Channel), a PSSCH (Physical Sidelink Shared Channel), a PSDCH (Physical Sidelink Discovery Channel), a PSBCH (Physical Sidelink Broadcast Channel) or the like to other user equipments 20, and the reception unit 120 receives the PSCCH, the PSSCH, the PSDCH, the PSBCH or the like from other user equipments 20.

The configuration unit 230 stores various configurations received at the reception unit 220 from the base station apparatus 10 or the user equipments 20 in a memory and reads out them from the memory as needed. Also, the configuration unit 230 stores preconfigured configurations. Contents of the configurations may be configurations associated with the random access and so on, for example.

The control unit 240 performs the two-step random access procedure or the four-step random access procedure with the base station apparatus 10 as stated above. The functional portion of the control unit 240 regarding signal transmission may be included in the transmission unit 210, and the functional portion of the control unit 240 regarding signal reception may be included in the reception unit 220.

(Hardware Arrangement)

The block diagrams (FIGS. 12 and 13) used for the description of the above embodiments show blocks of functional units. These functional blocks (components) are implemented by any combination of at least one of hardware and software. In addition, the implementation method of each function block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, etc. For example, a functional block (component) that functions to transmit is called a transmitting unit or a transmitter. In either case, as described above, the implementation method is not particularly limited.

Figure 14:
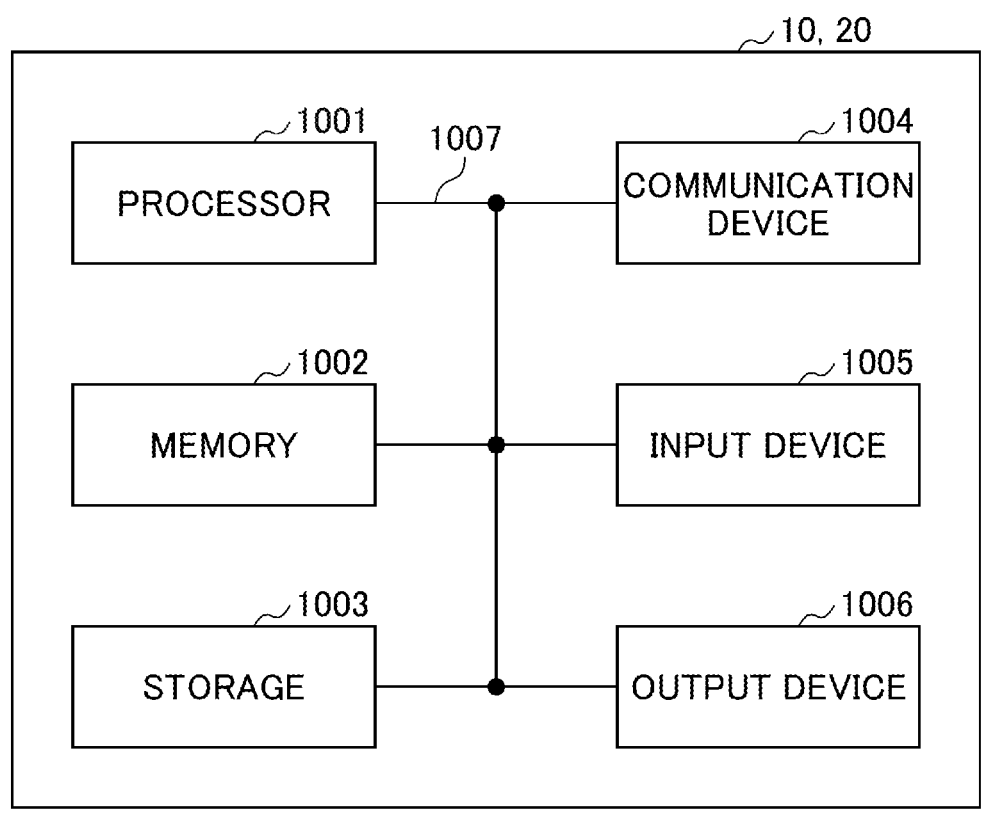
FIG. 14 is a diagram for illustrating one exemplary hardware arrangement of the base station apparatus 10 or the user equipment 20 according to an embodiment of the present invention.

For example, each of the base station apparatus 10, the user equipment 20 and so on according to one embodiment of the present invention may function as a computer performing operations for a radio communication method according to this embodiment. FIG. 14 is a diagram illustrating an example of a hardware configuration of the base station apparatus 10 and the user equipment 20 according to one embodiment of the present disclosure. The base station 10 and the user equipment 20 as stated above may be physically configured as a computer device including a processor 1001, a memory 1002, a storage 1003, a communication device 1004, an input device 1005, an output device 1006, a bus 1007, etc.

In the following description, the term "device" can be read as a circuit, a device, a unit, etc. The hardware configuration of the base station apparatus 10 and the user equipment 20 may be configured to include one or more of the respective devices shown in the figure, or may be configured without some devices.

Each function of the base station apparatus 10 and the user equipment 20 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, the above-stated control units 140 and 240 or the like may be implemented with the processor 1001.

Additionally, the processor 1001 reads a program (program code), a software module, data, etc., from at least one of the storage 1003 and the communication device 1004 to the memory 1002, and executes various processes according to these. As the program, a program is used which causes a computer to execute at least a part of the operations described in the above-described embodiment. For example, the control unit 140 of the base station apparatus 10 shown in FIG. 12 may be implemented by a control program that is stored in the memory 1002 and that is operated by the processor 1001. Also, for example, the control unit 240 of the user equipment 20 shown in FIG. 13 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a ROM (Read Only Memory), an EPROM (Erasable Programmable ROM), an EEPROM (Electrically Erasable Programmable ROM), a RAM (Random Access Memory), etc. The memory 1002 may be referred to as a register, a cache, a main memory (main storage device), etc.

The memory 1002 may store a program (program code), a software module, etc., which can be executed for implementing the radio communication method according to one embodiment of the present disclosure.

The storage 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, etc. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, etc. The communication device 1004 may be configured to include, for example, a high frequency switch, a duplexer, a filter, a frequency synthesizer, etc., to implement at least one of frequency division duplex (FDD: Frequency Division Duplex) and time division duplex (TDD: Time Division Duplex). For example, a transceiver antenna, an amplification unit, a transceiver unit, a channel interface or the like may be implemented with the communication device 1004. The transceiver unit may have an implementation with the transmission unit and the reception unit that are physically or logically separated.

The input device 1005 is an input device (e.g., a keyboard, a mouse, a microphone, a switch, a button, a sensor, etc.) that receives an external input. The output device 1006 is an output device (e.g., a display, speaker, LED lamp, etc.) that performs output toward outside. The input device 1005 and the output device 1006 may be configured to be integrated (e.g., a touch panel).

Each device, such as processor 1001 and memory 1002, is also connected by the bus 1007 for communicating information. The bus 1007 may be formed of a single bus or may be formed of different buses between devices.

Also, the base station apparatus 10 and the user equipment 20 may include hardware, such as a microprocessor, a digital signal processor (DSP: Digital Signal Processor), an ASIC (Application Specific Integrated Circuit), a PLD (Programmable Logic Device), and a FPGA (Field Programmable Gate Array), which may implement some or all of each functional block. For example, the processor 1001 may be implemented using at least one of these hardware components.

Conclusion of the Embodiments

As stated above, according to an embodiment of the present invention, there is provided a user equipment, comprising: a transmission unit that transmits a first message including a random access preamble in a two-step random access procedure; a reception unit that receives one or more second messages for contention resolution in the two-step random access procedures; and a control unit that controls an operation to receive the second messages based on information associated with an identifier of the first message included in the second messages.

According to the above arrangement, the user equipment 20 can obtain information associated with a predetermined identifier included in a MsgB in the two-step random access procedure to stop a reception operation for the MsgB in a MsgB reception window depending on situations. Namely, efficiency associated with the message reception in the random access procedure can be improved.

The reception unit may receive the second messages within a predetermined period, the second messages being scrambled with a scrambling code, and the control unit may stop the operation to receive the second messages at a first time point within the predetermined period based on the information associated with the identifier. According to the arrangement, the user equipment 20 can obtain information associated with a predetermined identifier included in a MsgB in the two-step random access procedure to stop a reception operation for the MsgB in a MsgB reception window depending on situations.

The information associated with the identifier may include the identifier included in the one or more second messages received within the predetermined period. According to the arrangement, the user equipment 20 can obtain information associated with a predetermined identifier included in a MsgB in the two-step random access procedure to stop a reception operation for the MsgB in a MsgB reception window depending on situations.

The information associated with the identifier may include information indicative of a total number of the identifiers included in the one or more second messages transmitted within the predetermined period. According to the arrangement, the user equipment 20 can obtain information associated with a predetermined identifier included in a MsgB in the two-step random access procedure to stop a reception operation for the MsgB in a MsgB reception window depending on situations.

The information associated with the identifier may include information indicative of a total number of the identifiers included in the one or more second messages to be transmitted after a second time point within the predetermined period. According to the arrangement, the user equipment 20 can obtain information associated with a predetermined identifier included in a MsgB in the two-step random access procedure to stop a reception operation for the MsgB in a MsgB reception window depending on situations.

Also, according to an embodiment of the present invention, there is provided a base station apparatus, comprising: a reception unit that receives first messages from one or more user equipments in a resource composed of a same frequency domain and a same time domain, the first messages including a random access preamble in a two-step random access procedure; a transmission unit that transmits second messages to the user equipments, the second messages being as many in number as received first messages and being used for contention resolution in the two-step random access procedure; and a control unit that includes information associated with identifiers in the second messages for identifying the one or more first messages.

According to the above arrangement, the user equipment 20 can obtain information associated with a predetermined identifier included in a MsgB in the two-step random access procedure to stop a reception operation for the MsgB in a MsgB reception window depending on situations. Namely, efficiency associated with the message reception in the random access procedure can be improved.

Supplemental Embodiments

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user equipment 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (a MIB (Master Information Block) and a SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also, a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user equipment 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. However, the other network node may be a combination of a plurality of other network nodes (for example, an MME and a S-GW).

Information, signals, or the like described in the present disclosure may be output from an upper layer (or a lower layer) to a lower layer (or an upper layer). Information, signals, or the like described in the present disclosure may be input and output via a plurality of network nodes.

Information or the like that has been input or output may be stored at a predetermined location (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Also, software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Also, information, parameters, and the like described in the present disclosure may be expressed by absolute values, may be expressed by relative values with respect to predetermined values, and may be expressed by corresponding different information. For example, radio resources may be indicated by indices.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells. In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication device, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Things) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of user equipments 20 (that may be called D2D (Device-to-Device), V2X (Vehicle-to-Everything), or the like). In this case, a user equipment 20 may have above-described functions of the base station apparatus 10. In this regard, a word such as "up" or "down" may be replaced with a word corresponding to communication between terminals (for example, "side"). For example, an uplink channel, a downlink channel, or the like may be replaced with a side channel.

Similarly, a user terminal according to the present disclosure may be read as a base station. In this case, a base station may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above-described apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of numerology.

The numerology may be a communication parameter that is applied to at least one of transmission and reception of a signal or a channel. The numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in a frequency domain, a specific windowing processing performed by a transceiver in a time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on the numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit for transmitting a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, a normal TTI, a subframe, and the like) may be read as TTI having a time length exceeding 1 ms, and a short TTI (for example, a shortened TTI) may be read as a TTI having a TTI length less than the TTI length of the long TTI and equal to or more than 1 ms.

A resource block (RB) is a resource assignment unit in terms of a time domain and a frequency domain and may include one or a plurality of consecutive subcarriers in terms of frequency domain. The number of subcarriers included in an RB may be the same regardless of the numerology, and, for example, may be 12. The number of subcarriers included in a RB may be determined based on the numerology.

Also, in terms of the time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

Also, a resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for certain numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of configured BWPs may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following the article is of a plural form.

Throughout the present disclosure, an expression that "A and B are different" may mean that "A and B are different from each other". Also, this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, a MsgA is one example of the first message including a random access preamble in a two-step random access procedure. A MsgB is one example of the second message for contention resolution in the two-step random access procedure.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

LIST OF REFERENCE SYMBOLS

10 Base station apparatus
110 Transmission unit
120 Reception unit
130 Configuration unit
140 Control unit
20 User equipment
210 Transmission unit
220 Reception unit
230 Configuration unit
240 Control unit
1001 Processor
1002 Memory
1003 Storage
1004 Communication device
1005 Input device
1006 Output device

The invention claimed is:
1. A terminal comprising:
a transmitter that transmits a first message including a Cell-Radio Network Temporary Identifier (C-RNTI) of the terminal in a two-step random access procedure;
a receiver that is configured to receive a plurality of second messages in the two-step random access procedure within predetermined period of "MsgB reception window;" and
a processor that, even if MsgB reception window has not run out, stops reception of the second messages at a time point when a second message including information related to contention resolution corresponding to the first message, the C-RNTI of the terminal, and information indicating whether the C-RNTI of the terminal is included in the second messages is received.
2. A communication system comprising:
a terminal including:
a transmitter of the terminal that transmits a first message including a Cell-Radio Network Temporary

Identifier (C-RNTI) of the terminal in a two-step random access procedure to a base station;

a receiver of the terminal that is configured to receive a plurality of second messages in the two-step random access procedure within predetermined period of "MsgB reception window" from the base station; and a processor that, even if MsgB reception window has not run out, stops reception of the second messages at a time point when a second message including information related to contention resolution corresponding to the first message, the C-RNTI of the terminal, and information indicating whether the C-RNTI of the terminal is included in the second messages is received, and the base station including:

a receiver of the base station that receives the first message including the C-RNTI of the terminal in the two-step random access procedure; and a transmitter of the base station that transmits one or more second messages used for contention resolution in the two-step random access procedure.

3. A communication method comprising:

transmitting a first message including a Cell-Radio Network Temporary Identifier (C-RNTI) of a terminal in a two-step random access procedure;

configuring receiving a plurality of second messages in the two-step random access procedure within predetermined period of "MsgB reception window;" and even if MsgB reception window has not run out, stopping reception of the second messages at a time point when a second message including information related to contention resolution corresponding to the first message, the C-RNTI of the terminal, and information indicating whether the C-RNTI of the terminal is included in the second messages is received.

* * * * *